(12) United States Patent
Urwin (10) Patent No.: US 10,995,880 B2
(45) Date of Patent: May 4, 2021

(54) TOWER WITH INTEGRATED WINCH

(71) Applicant: IHC Holland IE B.V., Sliedrecht (NL)

(72) Inventor: Nigel John Urwin, Hexham (GB)

(73) Assignee: IHC Holland IE B.V., Sliedrecht (NL)

( * ) Notice: Subject to any disclaimer, the term of this patent is extended or adjusted under 35 U.S.C. 154(b) by 6 days.

(21) Appl. No.: 16/484,133

(22) PCT Filed: Feb. 13, 2018

(86) PCT No.: PCT/NL2018/050098
§ 371 (c)(1),
(2) Date: Aug. 7, 2019

(87) PCT Pub. No.: WO2018/151592
PCT Pub. Date: Aug. 23, 2018

(65) Prior Publication Data
US 2020/0018423 A1 Jan. 16, 2020

(30) Foreign Application Priority Data

Feb. 16, 2017 (NL) ..................................... 2018384

(51) Int. Cl.
*F16L 1/235* (2006.01)
*F16L 1/20* (2006.01)
*B66D 1/74* (2006.01)

(52) U.S. Cl.
CPC ............ *F16L 1/207* (2013.01); *B66D 1/7405* (2013.01); *B66D 2700/0141* (2013.01); *B66D 2700/0166* (2013.01)

(58) Field of Classification Search
CPC ....... F16L 1/12; F16L 1/14; F16L 1/16; F16L 1/18; F16L 1/19; F16L 1/205; F16L 1/23; F16L 1/235; F16L 1/202; F16L 1/207; B66C 23/00; B66C 23/18; B66C 23/36; B66C 23/52; B66C 23/525; B66C 23/53; B66C 23/60; B66C 23/605; B66C 23/62; B66C 13/18; E21B 19/22; B63B 27/08; B63C 7/02; B66D 3/26; B66D 1/28; B66D 1/50; B66D 1/52; B66D 1/60; B66D 2700/0183
USPC ... 405/166, 167, 168.1, 168.2, 168.3, 168.4, 405/169–173; 212/307–311
See application file for complete search history.

(56) References Cited

U.S. PATENT DOCUMENTS

| 1,299,261 | A | 4/1919 | Taylor | |
|---|---|---|---|---|
| 7,451,720 | B2 * | 11/2008 | Somers | ................. E04H 12/003 116/173 |
| 2013/0084135 | A1 * | 4/2013 | Cruickshank | ............ F16L 1/19 405/167 |
| 2014/0334880 | A1 * | 11/2014 | Roodenburg | ............ F16L 1/19 405/166 |

(Continued)

FOREIGN PATENT DOCUMENTS

| WO | 2011/159159 A1 | 12/2011 |
|---|---|---|
| WO | 2015/167328 A1 | 11/2015 |
| WO | 2016/175651 A1 | 11/2016 |

*Primary Examiner* — Sunil Singh
(74) *Attorney, Agent, or Firm* — N.V. Nederlandsch Octrooibureau; Catherine A. Shultz; Katelyn J. Bernier (57) ABSTRACT

A tower for a pipe laying system comprises a frame with a leg to support the frame, and a winch support integrally formed with the leg. The winch support is able to receive and support a winch and/or winch components. The winch support can be formed in a lower portion of the tower leg.

18 Claims, 6 Drawing Sheets

(56) References Cited

U.S. PATENT DOCUMENTS

2016/0252195 A1    9/2016  Roodenburg et al.
2017/0051847 A1*   2/2017  Roodenburg ........... E21B 19/22

* cited by examiner

TOWER WITH INTEGRATED WINCH

FIELD OF THE INVENTION

The present invention relates to towers for laying marine pipelines, and particularly such towers with winches.

BACKGROUND ART

Subsea pipelines are often used in many different ways, for example in the oil and gas industry for transport of the oil and gas from offshore locations to production centres, for transporting electrical current, optical signals, information, etc. The pipelines may be either of a flexible or rigid type, and to lay such pipelines, pipeline laying vessels are often used. Pipeline laying vessels will often employ a ramp or tower to support and guide the pipeline during the laying process. The tower may be fixed, but more often is pivotable to allow the pipeline to be laid at different angles. Some examples of pipeline laying systems employing a tower include, but are not limited to, flex-lay, reel-lay, J-lay and multi-lay systems.

For a flex-lay system, a flexible pipeline is stored on reels, carousels or baskets on board the vessel. During the laying process, the pipeline is spooled from its storage location to the tower top and then lowered via the tower into the sea and down to the seabed.

For the reel-lay system, a pipeline is prepared onshore where long lengths of rigid pipe are welded together to form a continuous pipeline. The pipeline is tested and coated before being spooled onto a reel which is then stored on board the pipe laying vessel. During the laying process, the pipeline is spooled from its storage reel to the tower top, straightened and then lowered via the tower down to the seabed.

For a J-lay system, sections of rigid pipeline are stored on board the vessel. During the laying process, sections are lifted to be aligned with the tower and each other, where they are welded together, tested and coated. In this way, the sections are interconnected so as to form a continuous pipeline which is lowered towards the seabed.

A multi-lay system is a flexible system which may combine any or all of the previously mentioned pipe laying methods on a single vessel i.e. flex-lay, reel-lay and J-lay.

Each of these systems typically use a tower with traction winches which are mounted onto the tower legs (FIG. 1). The tower mounted traction winches can be used for different purposes, including to provide the wire rope tension for the abandon and recovery ("A&R") systems.

Currently, a traction winch is an independent sub system which is typically attached to the tower through various pin and sliding clamp type arrangements, although other methods of attachment are also possible. The pins and clamps concentrate the forces into localized areas and require dedicated, locally stiffened, mounting points. There is also a degree of structural inefficiency, since the tower leg fabrication and the winch frame fabrication work independently and have no load sharing capability.

SUMMARY

According to a first aspect of the invention, a tower for a pipe laying system comprises a frame with a leg to support the frame, and a winch support integrally formed with the leg, the winch support able to receive and support a winch and/or winch components.

Figure 1A:
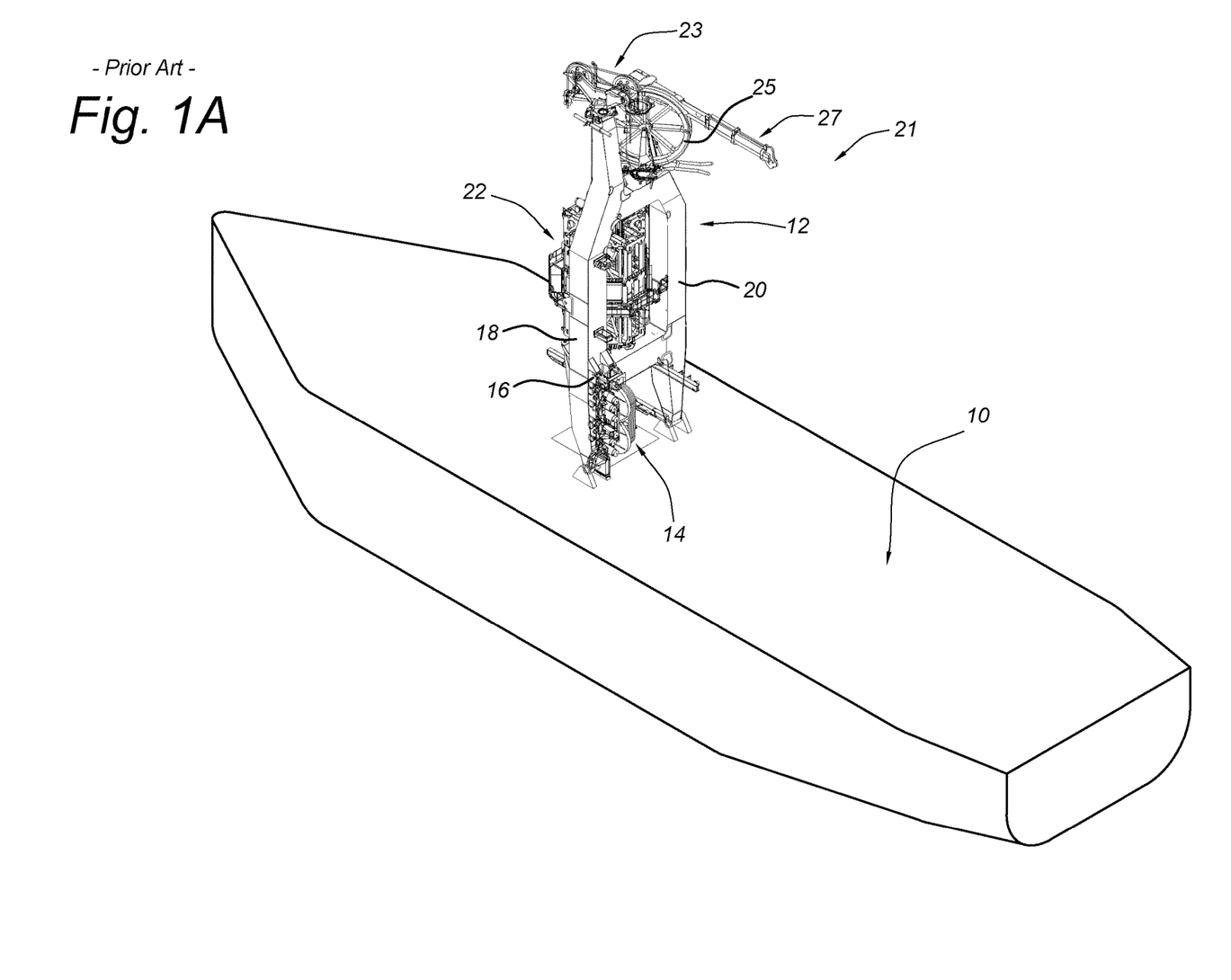
FIG. 1A shows a perspective view of a vessel with a prior art tower with winch connected.
Figure 2:
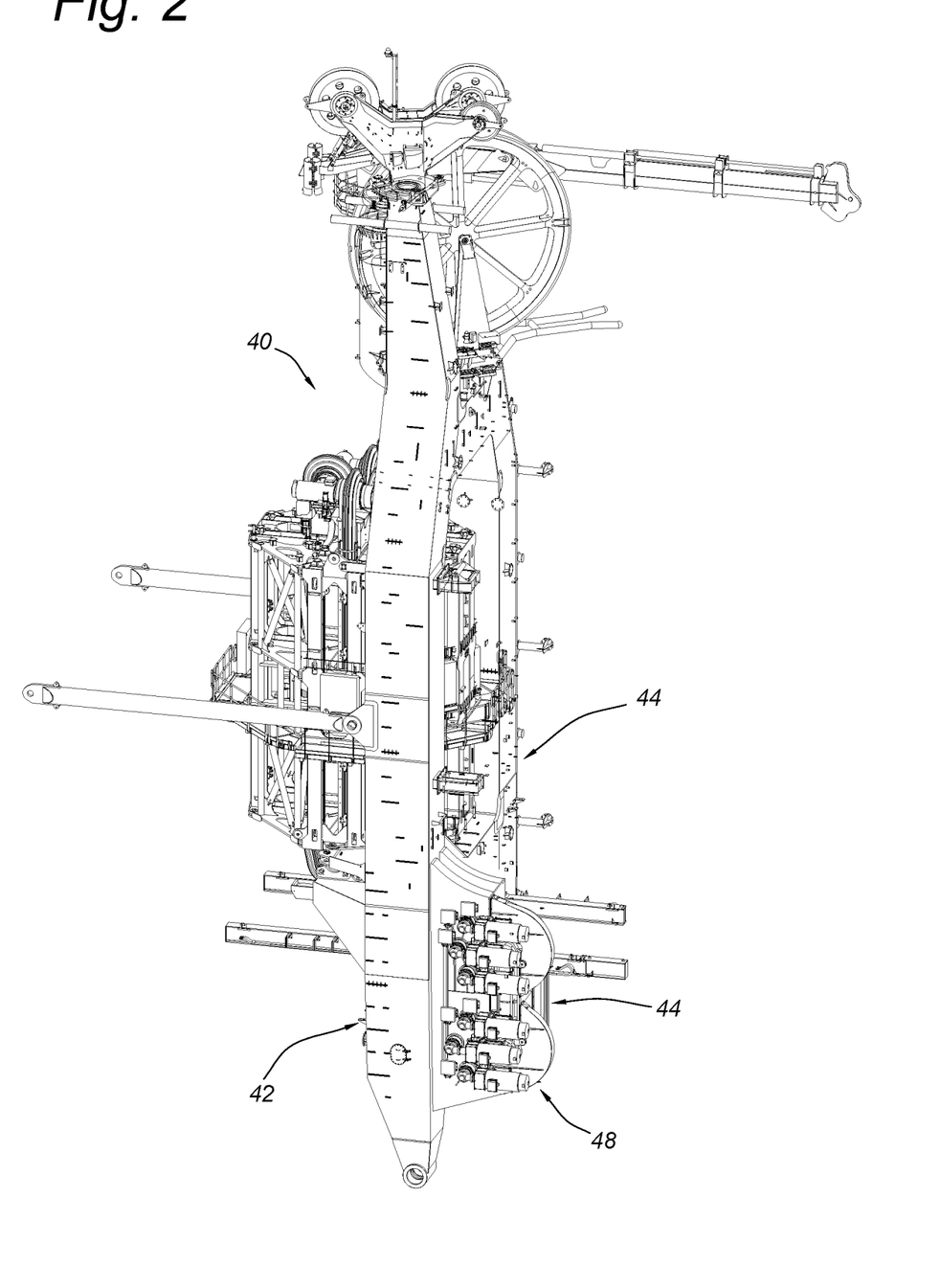
FIG. 2 shows a view of a tower with winch according to the current invention.

Such a tower provides a strong and stable base to support a winch. At least some components of the winch, such as the winch housing, can be at least partially formed within the leg so that fewer separate components are needed, which can lead to fewer points for connecting the winch to a leg. This can also lead to a direct force transfer to the leg, avoiding potential weak points and/or wear at connection points. The tower with integral winch support provides a more compact arrangement by at least partially situating the winch within the tower leg. This provides additional space on and around the tower which may then be occupied by other equipment or made use of during pipe laying operations or any other operations on the vessel. The frame can be a frame for pipe laying means as shown in FIGS. 1A and 2, or any other kind of frame structure with at least one leg for support.

According to an embodiment, the winch support comprises a winch housing extending at least partially into the leg for receiving at least part of a drum; and a mount for supporting a winch shaft. By forming the housing at least partially extending into the leg, fewer separate parts are needed to house the winch and connect to the tower.

According to an embodiment, the winch support further comprises one or more further mounts for supporting one or more further winch components. Optionally, the one or more further mounts are configured for supporting one or more of: a further winch shaft, a motor, a gearbox, a drum, gearwheels, a cooling system, an electric system, and a protective cover. Such mounts can help to directly support and transfer the force from the winch and winch components to the leg for a strong and stable connection.

According to an embodiment, the tower further comprises one or more localized stiffening parts of the leg at or near the winch support. Optionally, the stiffening may be achieved by: locally thickening the wall of the tower, or by adding stiffening elements (e.g., flanges or other parts), or by some combination of both. Making the tower leg locally thicker can make the external dimensions grow locally to accommodate the winch, which could be especially useful if the winch is particularly large and would not normally fit within the tower leg. For very large winches, a whole leg section may be locally enlarged to accommodate the winch. The stiffening parts can be the same material as the leg or a different material. The locally stiffening parts can provide the necessary strength at only the parts needed to support the winch without requiring a thicker leg throughout, saving on materials costs and weight. Further, localized stiffening, for example, through adding material to a part of the leg can be an economical and relatively simple way of forming a leg with the required strength.

According to an embodiment, the tower is steel.

According to an embodiment, the tower is a tower for a flexible, a rigid, or a multi-lay pipe laying system.

According to an embodiment, the winch support is formed in a portion of the leg. Optionally, this is a lower portion of the leg. By forming in a portion of the leg, the winch can, for example, only face one direction and be kept to a small area, leaving other sides free for other equipment or persons.

According to an embodiment, any force on the winch support directly transfers to the leg. This allows for a stable support for the winch. Currently, a prior art winch has its own separate housing which is mounted to the tower leg. Forces generated by the winch and the rope tensions are carried by the housing and transferred to the leg via the winch mounting arrangements. Advantageously, the invention provides a more direct and efficient load path directly to the leg without the need for a separate winch housing or winch housing mounting arrangement.

According to an embodiment, the tower further comprises a winch supported by the winch support and extending at least partially into the tower leg such that the tower leg forms at least part of a housing for the winch.

According to a further aspect of the invention, a vessel comprises the tower with winch support.

According to an embodiment, the tower comprises two legs, and the winch support is formed in the leg on the port side. However, in other embodiments, the tower could have a different number of legs, and the winch support could be formed in any of them.

According to an aspect of the invention, a method of forming a tower comprises forming a tower with a leg; and integrally forming a winch support in the leg. Such a method provides a tower that can stably support a winch with fewer parts than if the tower were formed separately and then had to be adapted to be able to support a winch. By integrally forming the winch support into the leg, a number of significant efficiencies and savings can be made, including eliminating the need for a separate winch housing and some locally stiffened mounting points. This can make it easier and cheaper to manufacture. Further, the reduced or eliminated need for various pins and sliding clamp assemblies of the prior art winch saves weight and cost of manufacture. The integrated winch support also saves the assembly time and effort that was required to connect past winch assemblies to a tower leg.

According to an embodiment, the step of integrally forming a winch support in the leg comprises forming the leg with a recess to receive at least part of a winch drum and a support to support a winch shaft. Forming a recess to receive at least part of a winch drum allows the leg to act as at least part of the winch housing, thereby requiring fewer separate components than prior art systems.

According to an embodiment, the method further comprises forming the leg with one or more mounts to support one or more additional winch components. Such one or more mounts can be a stable support to mount any further winch components as desired. Forming mounts integrally with the leg also allows for fewer complicated mounting interfaces between the winch, winch components and the tower.

SHORT DESCRIPTION OF DRAWINGS

The present invention will be discussed in more detail below, with reference to the attached drawings, in which.

DESCRIPTION

Figure 1B:
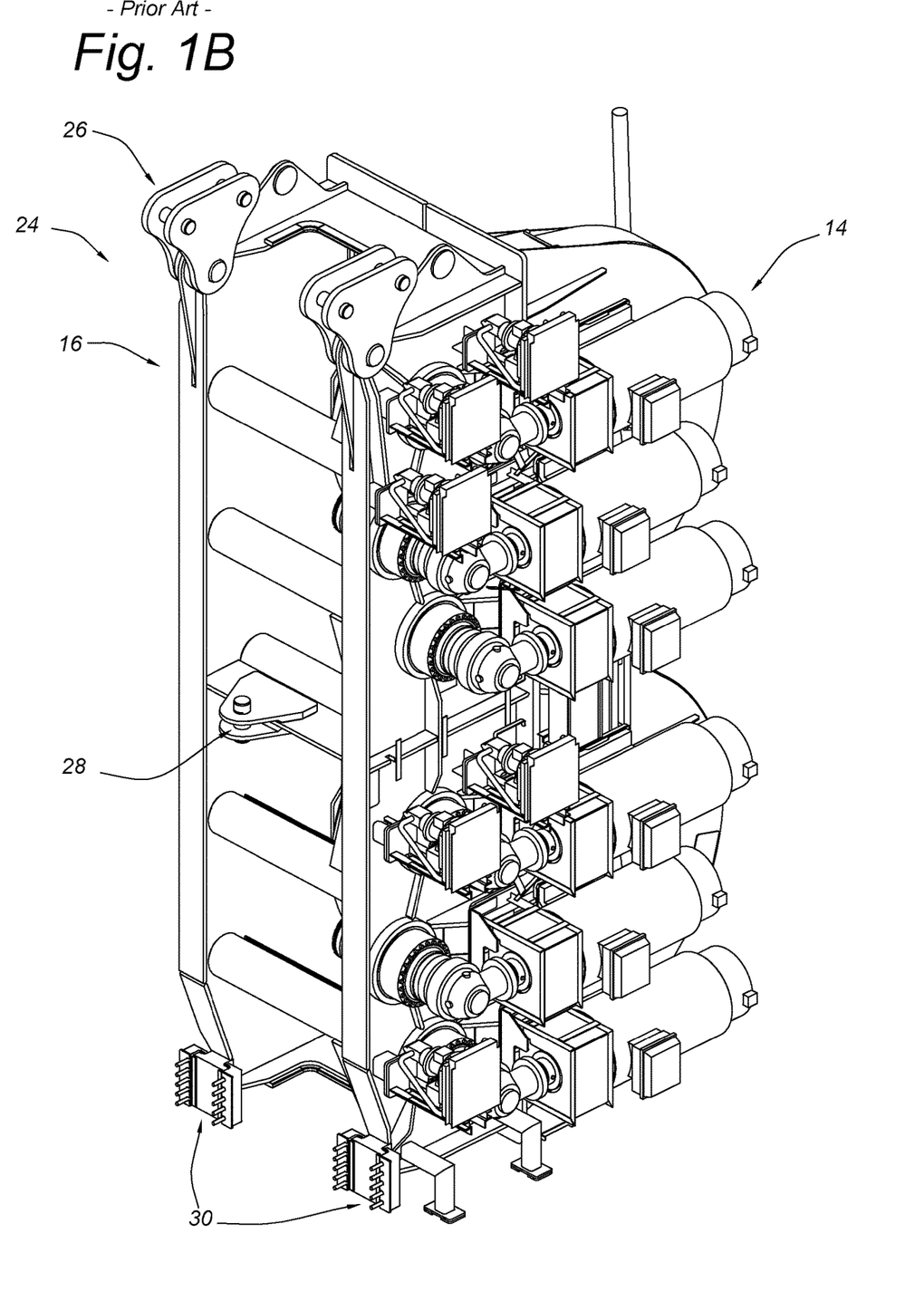
FIG. 1B shows a back view of the prior art winch and housing connection.

FIG. 1A shows a perspective view of a vessel 10 with a prior art tower 12 with winch 14 with housing 16; and FIG. 1B shows a back view of prior art traction winch 14 and housing 16 not connected to tower 12. Tower 12 includes first leg 18 and second leg 20, and is mounted to vessel 10. FIG. 1A also shows parts of a pipe laying system 21, including tensioner 22, A&R 23, aligner wheel 25 and crane 27. Other parts of pipe laying system 21 are not shown, for example, below deck parts such as pipe storage and handling systems.

Tower 12 is a flex-lay tower. The flexible product (pipe) is brought up to the top of tower 12 and fed over aligner wheel 25. Crane 27 helps with this process (as well as other handling functions). The pipe is passed through tensioner 22 and then typically through a moonpool into the water. If tower 12 is mounted at an end or side of vessel 10, the pipe could feed directly into the water, not through a moonpool. Tensioner 22 grips the product and supports the weight of the suspended product. Tensioner 22 also controls the rate of descent of the product. A&R 23 is used to abandon the end of the product to the sea floor at the end of an operation. It can also be used to recover an end of product from the sea floor and bring it back up to the vessel 10, for example, to connect to a new reel of pipe to continue further laying. A&R 23 is also used to abandon and recover other items, such as pipeline jewelry and bulky items.

Winch 14 includes a number of standard winch components (drums, shafts, gearbox, electric system, etc.) which are mounted to housing 16. Housing 16 includes connection assembly 24 at a back side, which connects to tower 12. In this example the connection assembly 24 includes upper pinned assemblies 26, middle pin assembly 28 and lower sliding clamp assemblies 30, although other mounting arrangements are possible. Pin assemblies 26, 28 and sliding clamp assemblies 30 connect to tower 12 leg 18 interfaces to secure housing 16 and winch 14 to tower 12 leg 18 for operations. Generally, winch 14 and housing 16 are manufactured separately, and later supplied to be connected to tower 12 at a mounting interface that must be fabricated and machined.

The current invention forms a winch support integrally with the tower leg to provide a stable mounting for a winch with fewer separate parts to manufacture and fit together. FIG. 2 shows an embodiment of such a tower 40, with tower legs 42, 44 and winch 48. Tower 40 can be formed of different materials, for example, steel or other strong metals or materials for supporting a pipe laying system and winch 48. Winch 48 is generally located in a lower portion of leg 42, though can be located elsewhere. Tower 40 is a flex-lay tower and includes many of the same components as explained in relation to tower 10 of FIG. 1a, and works in a similar manner.

Figure 3A:
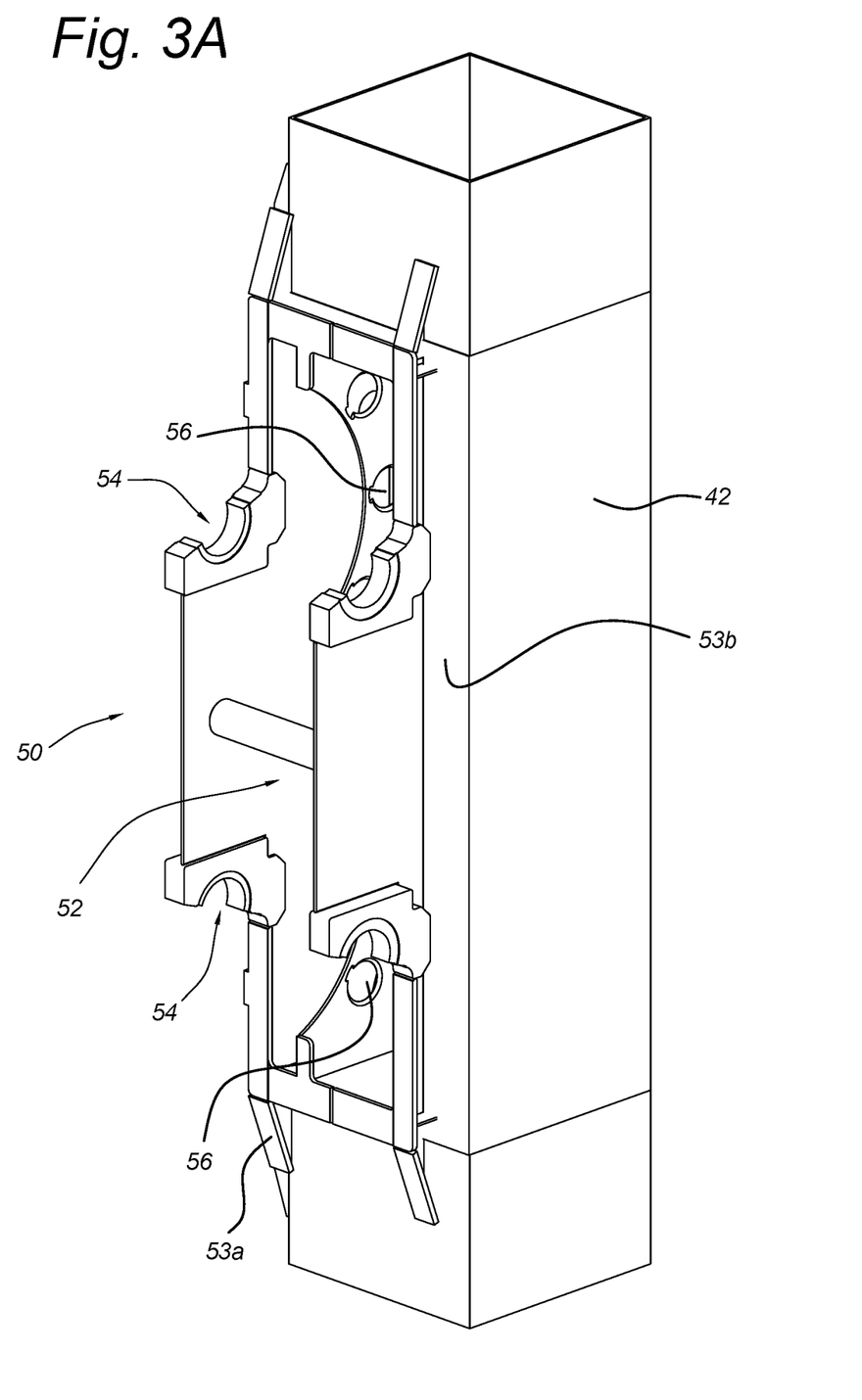
FIG. 3A shows a close up perspective view of a part of a tower leg with an integrally formed winch support according to the current invention.
Figure 3B:
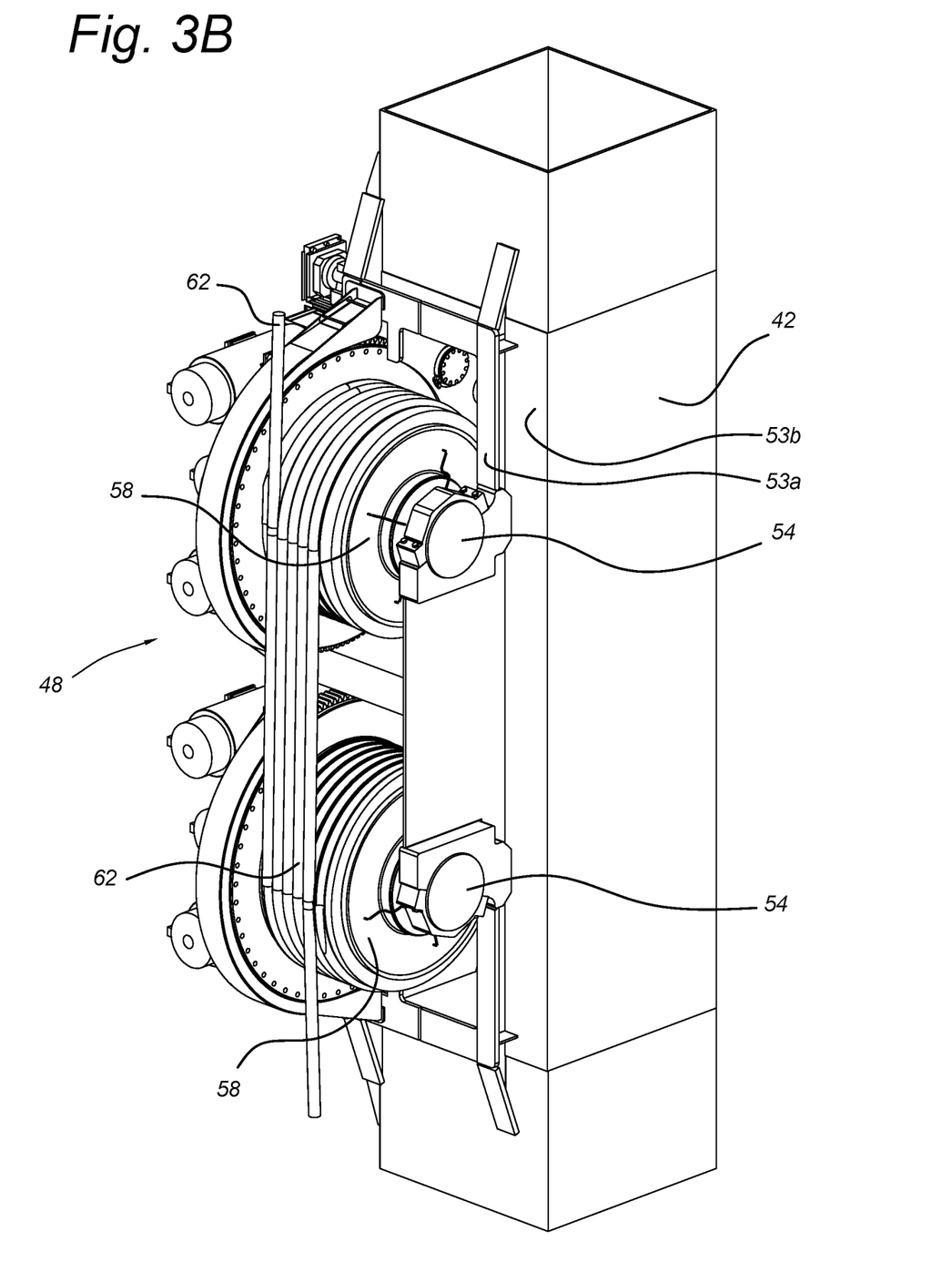
FIG. 3B shows a close up perspective view of a winch mounted to the tower leg of FIG. 3A from a first side.
Figure 3C:
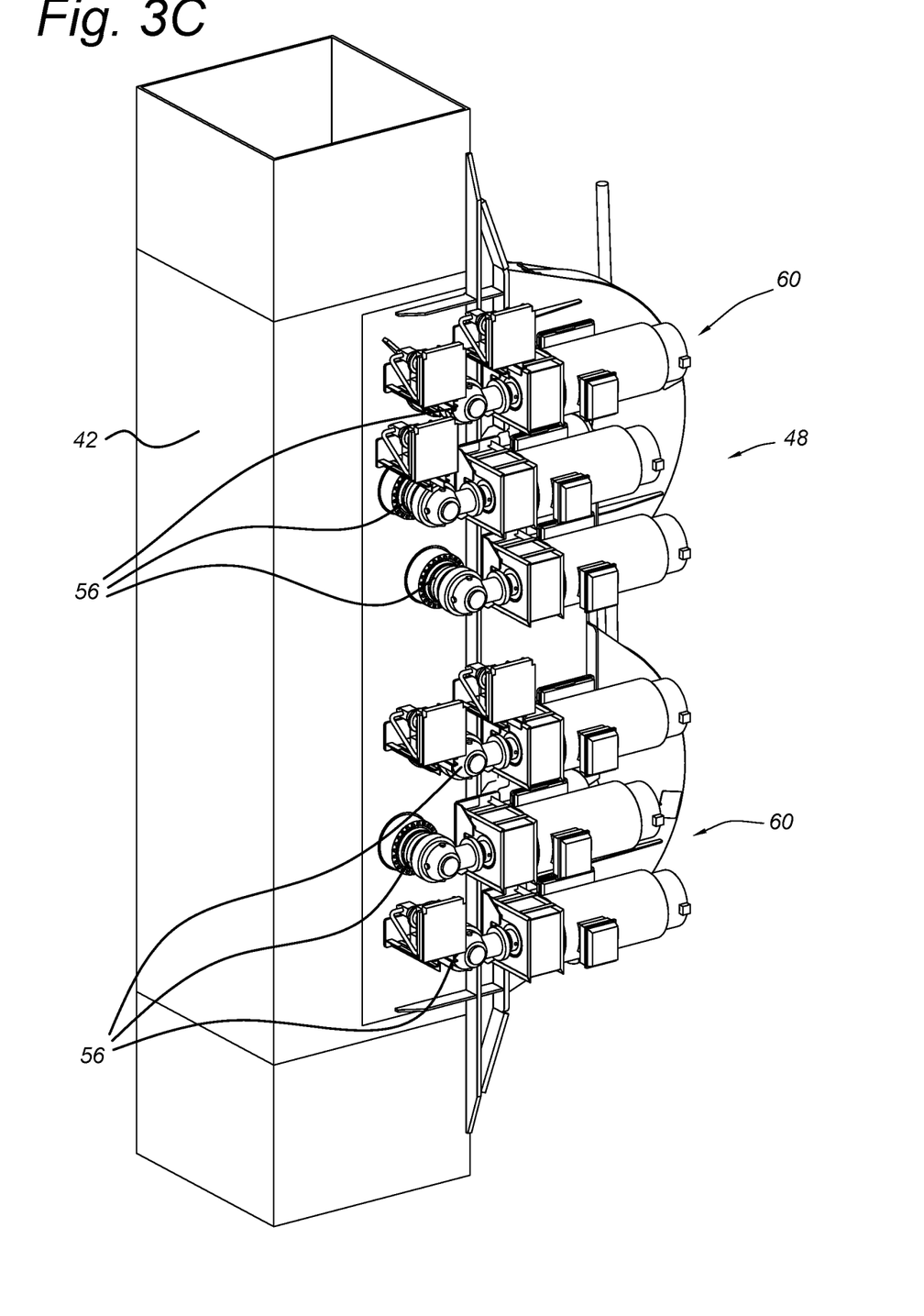
FIG. 3C shows a close up perspective view of the winch mounted to the tower leg of FIG. 3A from a second side.

FIG. 3A shows a close up perspective view of a winch support 50 in leg 42, FIG. 3B shows a close up perspective view of a winch 48 mounted to tower leg 42 from a first side, and FIG. 3C shows a perspective view of tower leg 42 and winch 48 from a second side.

Tower leg 42 includes winch support 50, which includes winch housing 52, locally stiffened parts 53a, 53b, shaft mounts 54, and further mounts 56, for supporting one or more of: a drive unit, a motor, gearbox, gearwheels, cooling and/or heating systems, an electric system, a protective cover or other components. Winch housing 52 extends into leg 42, forming a recess in leg 42 for housing at least a part of winch 48.

Winch 48 includes drums 58, further winch components 60 and rope 62. Further winch components 60 could be varied components depending on the winch 48 needed, and could include one or more of a drive unit, a motor, gearbox, gearwheels, cooling and/or heating systems, an electric system, a protective cover or other components.

Winch support 50 is integrally formed into tower leg such that housing 52 extends at least partially into leg 42 for receiving at least a part of drums 58 and other components (such as shaft mounts 54) can extend beyond the general shape of leg 42. Shaft mounts 54 are integrally formed in leg 42 such that the force of winch 48 is transferred directly to leg 42. One or more parts of leg 42 at or near winch support 50 can be locally stiffened. In this embodiment, flange 53a stands out from tower leg 42 wall, which maintains the strength of the tower near the opening forming winch housing 52. Wall sections 53b (and flanges) could also be thicker than the general thickness of tower leg 42 walls, for example, 20-40% thicker to help maintain strength.

By forming tower 40 leg 42 with integral winch support 50, tower 40 is able to provide a strong and stable base to support and at least partially house winch 48. Force is able to directly transfer from winch 48 to tower leg 42, avoiding potential weakness of past towers with winch systems that had to connect the winch housing to the tower leg. Additionally, by integrally forming winch mount 50 into tower leg, fewer separate parts are needed for manufacture for the overall system, simplifying the assembly process for assembling winch 48 and tower 40. The ability to locally reinforce and/or stiffen parts of tower leg 42, for example through flanges 53a and/or thickened wall 53b, ensures that leg 42 is not locally weakened by forming winch mount 50 integrally with the leg 42, and that leg 42 maintains the required strength to handle the structural loads of laying pipes and environmental loads on tower 40. The ability to locally reinforce and/or stiffen parts of tower leg 42 also ensures that leg 42 will have sufficient support for any winch loads likely to be encountered during operations of tower 40. Forming winch mount 50 integrally with leg 42 also allows for fewer complicated mounting interfaces between winch 48 (with separate housings) and tower 40.

As discussed in the background, a prior art winch has its own separate housing which is attached to the tower leg. The method of attachment usually requires various pin and sliding clamp type arrangements, although other methods of attachment may also be possible. The pins and clamps concentrate the forces into localized areas and require dedicated, locally stiffened, mounting points on both the leg and the winch housing. By integrally forming the winch support into the leg a number of significant efficiencies and savings are made. The integrated design does not require a separate winch housing, it is therefore lighter and cheaper to manufacture. There is also no need for the various pins and sliding clamp subassemblies which further saves weight and cost of manufacture. The integrated winch does not require mounting to the leg, further saving the time and effort that this would require.

While winch 48 is shown with two drums 58 and therefore multiple shaft mounts 54; other embodiments could have different configurations of winches, for example, with a different number of drums and/or different components. Additionally, winch support 50 could be located at a different location in tower 40 and/or tower 40 could have a different configuration depending on the desired use.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular or preferred embodiments disclosed, but that the invention will include all embodiments falling within the scope of the appended claims.

The invention claimed is:

1. A tower for a pipe laying system, the tower comprising:
   a frame with a leg to support the frame, and
   a winch support integrally formed with the leg, the winch support able to receive and support a winch and/or winch components, wherein the winch support comprises:
   a winch housing extending at least partially into the leg for receiving part of a drum; and
   a mount for supporting a winch shaft, the mount integrally formed with the leg but extending outside the general shape of the leg.

2. The tower of claim 1, wherein the winch support further comprises:
   one or more further mounts for supporting one or more further winch components.

3. The tower of claim 2, wherein the one or more further mounts are configured for supporting one or more of: a further winch shaft, a motor, a gearbox, a drum, gearwheels, a cooling system, an electric system, and a protective cover.

4. The tower of claim 1, and further comprising:
   one or more localized stiffening parts at or near the winch support.

5. The tower of claim 4, wherein the one or more localized stiffening parts comprises:
   one or more flanges standing out from the tower.

6. The tower of claim 4, wherein the one or more localized stiffening parts comprises one or more parts of a wall of the tower leg at or near the winch support which are thicker than other tower leg walls.

7. The tower of claim 1, wherein the tower is steel.

8. The tower of claim 1, wherein the tower is tower for a flexible, a rigid or a multi-lay pipe laying system.

9. The tower of claim 1, wherein the winch support is formed in a portion of the leg.

10. The tower of claim 9, wherein the winch support is formed in a lower portion of the leg.

11. The tower of claim 1, wherein any force on the winch support directly transfers to the leg.

12. The tower of claim 1, and further comprising:
    a winch supported by the winch support and extending at least partially into the tower leg such that the tower leg forms at least part of a housing for the winch.

13. The tower of claim 1, wherein the tower leg comprises a first side with a recess to receive at least part of the winch drum and the support to support the winch shaft.

14. A vessel comprising the tower of claim 1.

15. The vessel of claim 14, wherein the tower comprises two legs, and the winch support is formed in the leg on the port side.

16. A method of forming a tower comprising:
    forming a tower with a leg; and
    integrally forming a winch support in the leg such that a winch housing of the winch support extends at least partially into the leg for receiving part of a winch drum within the leg, the winch support further comprising a mount for supporting a winch shaft, the mount integrally formed with the leg but extending beyond the general shape of the leg.

17. The method of claim 16, wherein the step of integrally forming a winch support in the leg comprises:

forming the leg with a recess to receive at least part of the winch drum.

18. The method of claim 17, and further comprising:

forming the leg with one or more mounts to support one or more additional winch components.

* * * * *